United States Patent
Ko et al.

(10) Patent No.: US 9,637,580 B2
(45) Date of Patent: May 2, 2017

(54) METHOD FOR PREPARING VINYL CHLORIDE-BASED RESIN

(71) Applicant: HANWHA CHEMICAL CORPORATION, Seoul (KR)

(72) Inventors: Jeong Hwan Ko, Daejeon (KR); Paul Kang, Seoul (KR); Ji Won Kim, Yongin (KR); Hyung Hoon Sim, Incheon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/038,775

(22) PCT Filed: Aug. 29, 2014

(86) PCT No.: PCT/KR2014/008081
§ 371 (c)(1),
(2) Date: May 24, 2016

(87) PCT Pub. No.: WO2015/080367
PCT Pub. Date: Jun. 4, 2015

(65) Prior Publication Data
US 2016/0376387 A1 Dec. 29, 2016

(30) Foreign Application Priority Data

Nov. 28, 2013 (KR) .................. 10-2013-0146612

(51) Int. Cl.
| | | |
|---|---|---|
| C08F 2/00 | (2006.01) | |
| C08F 2/38 | (2006.01) | |
| C08F 4/28 | (2006.01) | |
| C08F 14/14 | (2006.01) | |
| C08F 214/06 | (2006.01) | |
| C08F 2/18 | (2006.01) | |
| C08F 2/24 | (2006.01) | |
| C09D 127/06 | (2006.01) | |
| C08F 2/26 | (2006.01) | |
| C08F 2/30 | (2006.01) | |

(52) U.S. Cl.
CPC .............. *C08F 214/06* (2013.01); *C08F 2/18* (2013.01); *C08F 2/24* (2013.01); *C09D 127/06* (2013.01); *C08F 2/26* (2013.01); *C08F 2/30* (2013.01)

(58) Field of Classification Search
CPC .................................. C08F 14/06; C08F 2/18
USPC ..................... 526/74, 227, 291, 62
See application file for complete search history.

(56) References Cited

U.S. PATENT DOCUMENTS

| | | | |
|---|---|---|---|
| 4,348,496 A | 9/1982 | Puhe | |
| 6,303,712 B1 * | 10/2001 | Kumakura | .............. C08F 14/06 526/227 |

FOREIGN PATENT DOCUMENTS

| | | |
|---|---|---|
| CN | 101338003 | 1/2009 |
| CN | 102382229 | 3/2012 |
| CN | 103289004 | 9/2013 |
| JP | 08-151495 | 6/1996 |
| KR | 10-0149045 | 6/1998 |
| KR | 10-0364240 | 11/2002 |
| KR | 10-0384381 | 8/2003 |
| KR | 10-2008-0049974 | 6/2008 |
| KR | 10-2009-0039955 | 4/2009 |
| KR | 10-2009-0117268 | 11/2009 |
| KR | 10-2012-0007227 | 1/2012 |
| KR | 10-2012-0022856 | 3/2012 |

OTHER PUBLICATIONS

PCT Search Report, Patent Cooperation Treaty, Nov. 26, 2014. Application No. PCT/KR2014/008081.

* cited by examiner

*Primary Examiner* — Wlliam Cheung
(74) *Attorney, Agent, or Firm* — Lex IP Meister, PLLC

(57) ABSTRACT

Provided is a method of preparing a vinyl chloride-based resin that includes preparing slurry through suspension polymerization by mixing a monomer, an oil soluble initiator, a dispersant, and an additive including an emulsifier, a water-soluble initiator, or a combination thereof, wherein the monomer includes vinyl chloride, an unsaturated carboxylic acid-based compound, and an ethylenic unsaturated compound that is copolymerizable therewith, and the emulsifier includes an anionic emulsifier, a non-ionic emulsifier, or a combination thereof.

13 Claims, No Drawings

METHOD FOR PREPARING VINYL CHLORIDE-BASED RESIN

This application is a National Stage Entry of International Application No. PCT/KR2014/008081, filed Aug. 29, 2014, and claims the benefit of and priority to Korean Application No. 10-2013-0146612, filed Nov. 28, 2013, all of which are incorporated herein by reference in their entirety.

TECHNICAL FIELD

A method for preparing a vinyl chloride-based resin is disclosed.

BACKGROUND ART

A vinyl chloride-based resin uses vinyl chloride, unsaturated carboxylic acid, and vinyl acetate as a monomer, and has excellent adherence to a metal material such as iron or aluminum, so it has been widely applied in fields of an ink binder and an adhesive. The vinyl chloride-based resin including carboxylic acid is generally used in China, the Middle East, India, etc., but when the resin is transported to the countries or stored for a long time under a high temperature and high humidity, the resin color is unfavorably changed into pink or red from the original white color. If the resin color is changed by heat during transportation or storage, the resin product value is lost, and the qualities such as adherence, solution discoloration, and the like may be deteriorated since the molecular structure is changed during the thermal discoloration.

DISCLOSURE

Technical Problem

An embodiment provides a method of preparing a vinyl chloride-based resin having excellent adherence, solution transparency, or the like, and that prevents thermal discoloration.

Solution to Problem

An embodiment provides a method of preparing a vinyl chloride-based resin that includes preparing a slurry through suspension polymerization by mixing a monomer, an oil soluble initiator, a dispersant, and an additive including an emulsifier, a water-soluble initiator, or a combination thereof, wherein the monomer includes vinyl chloride, an unsaturated carboxylic acid-based compound, and an ethylenic unsaturated compound that is copolymerizable therewith, and the emulsifier includes an anionic emulsifier, a non-ionic emulsifier, or a combination thereof.

Removing an unreacted monomer from the prepared slurry and dehydrating and drying the slurry from which the unreacted monomer is removed may be further included.

The anionic emulsifier may include an alkali metal salt or an ammonium salt of a C6 to C20 fatty acid, an alkali metal salt or an ammonium salt of a C6 to C20 alkylsulfonic acid, an alkali metal salt or an ammonium salt of a C6 to C20 alkylbenzenesulfonic acid, an alkali metal salt or an ammonium salt of a C6 to C20 alkylsulfate, an alkali metal salt or an ammonium salt of a C6 to C20 alkyldisulfonic acid diphenyl oxide, or a combination thereof.

The non-ionic emulsifier may include a C6 to C20 alcohol, polyethylene oxide, polyoxyethylene alkylphenylether, polyoxyethylene alkylether, sorbitan monolaurate, polyvinyl alcohol, polyethylene glycol, or a combination thereof.

The additive may be mixed in an amount of 0.005 to 1.0 parts by weight based on 100 parts by weight of the vinyl chloride.

The additive may include the emulsifier, and when the emulsifier includes the anionic emulsifier and the non-ionic emulsifier, the anionic emulsifier and the non-ionic emulsifier may be included in a weight ratio of 1:0.5 to 1:200.

The water-soluble initiator may include potassium persulfate, ammonium persulfate, sodium persulfate, sodium bisulfate, sodium hydrosulfite, or a combination thereof.

The oil soluble initiator may include t-butylperoxy neodecanoate, diisopropylperoxy dicarbonate, methylethylketone peroxide, di-2-ethylhexylperoxy dicarbonate, di-3-methoxybutylperoxy dicarbonate, t-butylperoxy pivalate, t-amylperoxy pivalate, t-hexylperoxy pivalate, or a combination thereof.

The additive may include the emulsifier and the water-soluble initiator, and the emulsifier and the water-soluble initiator may be included in a weight ratio of 1:50 to 50:1.

The vinyl chloride may be polymerized by batch injection or partial injection.

The unsaturated carboxylic acid-based compound may include: an unsaturated carboxylic acid including maleic acid, maleic acid anhydride, itaconic acid, acrylic acid, methacrylic acid, alpha-cyanoacrylic acid, or a combination thereof; an alkylester of an unsaturated carboxylic acid including methylacrylate, ethylacrylate, butylacrylate, octylacrylate, cyanoethylacrylate, methylmethacrylate, ethylmethacrylate, butylmethacrylate, or a combination thereof; or a combination thereof.

The ethylenic unsaturated compound may include vinyl acetate, vinyl propionate ester, acrylonitrile, methacrylonitrile, methylacrylamide, N-methylolacrylamide, ethylvinylether, chloroethylvinylether, alpha-methylstyrene, vinyltoluene, chlorostyrene, vinylnaphthalene, vinylidene fluoride, vinylidenechloride, vinylchloroacetate, olefin, chloro-olefin, isobutylvinyl ether, or a combination thereof.

A total amount of the unsaturated carboxylic acid-based compound and the ethylenic unsaturated compound may be 1 to 40 parts by weight based on 100 parts by weight of the vinyl chloride.

The dispersant may include polyvinyl alcohol, cellulose, gelatin, an acrylic acid polymer, a methacrylic acid polymer, an itaconic acid polymer, a fumaric acid polymer, a maleic acid polymer, a succinic acid polymer, or a combination thereof, which has a degree of saponification of greater than or equal to 40%.

Other embodiments are included in the following detailed description.

Advantageous Effects

The vinyl chloride-based resin obtained from the preparation method has excellent adherence and solution transparency, and prevents thermal discoloration during storage and transport under a high temperature environment, so that it may be usefully applied to an ink binder, an adhesive, or the like.

Best Mode

Hereinafter, embodiments of the present invention are described in detail. However, these embodiments are exemplary, the present invention is not limited thereto, and the present invention is defined by the scope of claims.

A vinyl chloride-based resin may be polymerized from monomers including vinyl chloride, an unsaturated carboxylic acid-based compound, and an ethylenic unsaturated compound that is copolymerizable therewith. Thermal discoloration may occur in the vinyl chloride-based resin polymerized by monomer. The resin may be discolored by binding of the unsaturated carboxylic acid-based compound with the vinyl chloride to form a molecular structure that is vulnerable to heat, and also by leaving the unreacted unsaturated carboxylic acid-based compound in the resin.

According to an embodiment, by using an additive including an emulsifier, a water-soluble initiator, or a combination thereof in the suspension polymerization using the monomer, the reaction of an unsaturated carboxylic acid-based compound may be induced to increase a conversion rate of the unsaturated carboxylic acid-based compound, and the added emulsifier or the water-soluble initiator may be positioned on the surface of the polymerized vinyl chloride-based resin to block heat transferred to the inside of resin. Thereby, it may prevent the thermal discoloration of the vinyl chloride-based resin.

For more specifically explaining the mechanism, the unsaturated carboxylic acid-based compound has high solubility to water compared to the vinyl chloride, so the unsaturated carboxylic acid-based compound is more easily distributed at the outside of a vinyl chloride droplet or aqueous phase than at the inside of the vinyl chloride droplet in the suspension polymerization in which the oil soluble initiator is used. Since the emulsifier may include an anionic emulsifier, a non-ionic emulsifier, or a combination thereof which is hydrophilic, it may capture the unsaturated carboxylic acid-based compound distributed at the outside of the vinyl chloride droplet and the aqueous phase, inducing the same to participate in polymerization, so that a reaction conversion rate of the unsaturated carboxylic acid-based compound may be enhanced. In addition, the water-soluble initiator may likewise enhance the reaction conversion rate of the unsaturated carboxylic acid-based compound. Further, the emulsifier or the water-soluble initiator induces formation of particle morphology distributed on the surface of the polymerized vinyl chloride-based resin, so as to minimize a change into a molecular structure such as a chromophore caused by generating a double bond by heat.

A method of preparing a vinyl chloride-based resin according to an embodiment is now specifically described.

A monomer, an oil soluble initiator, a dispersant, and an additive are mixed to prepare a slurry by a suspension polymerization method, an unreacted monomer is removed from the slurry, and the slurry from which the unreacted monomer is removed is dehydrated and dried to prepare a vinyl chloride-based resin. Herein, the additive may include an emulsifier, a water-soluble initiator, or a combination thereof.

In the suspension polymerization method, polywater at room temperature or at a high temperature may be used as a reaction medium. In addition, the monomer and the dispersant are uniformly dispersed, and the oil soluble initiator is dissembled at a constant temperature, for example, about 50° C. to about 70° C., and thereby, the polymerization may be performed by the chain reaction with the vinyl chloride monomer. Also, when the reaction conversion rate of the unsaturated carboxylic acid-based compound reaches a certain time point, the polymerization may be finished.

The prepared vinyl chloride-based resin may be obtained in a form of a particle having a size of about 50 to 200 μm. The vinyl chloride-based resin obtained in this way is dissolved in an ethylacetate or ketone-based solvent, and may be used as a coating agent requiring adherence.

The monomer may include vinyl chloride, an unsaturated carboxylic acid-based compound, and an ethylenic unsaturated compound that is copolymerizable therewith.

The vinyl chloride may be added at the same time, or partly partial amount over a few times during polymerization.

The unsaturated carboxylic acid-based compound may include: an unsaturated carboxylic acid including maleic acid, maleic acid anhydride, itaconic acid, acrylic acid, methacrylic acid, alpha-cyanoacrylic acid, or a combination thereof; an alkylester of an unsaturated carboxylic acid including methylacrylate, ethylacrylate, butylacrylate, octylacrylate, cyanoethylacrylate, methylmethacrylate, ethylmethacrylate, butylmethacrylate, or a combination thereof; or a combination thereof. Among them, the maleic acid, the maleic acid anhydride, and the itaconic acid may be preferably due to high water solubility.

The unsaturated carboxylic acid-based compound may be input in an amount of 0.5 to 40 parts by weight, and specifically, 1 to 5 parts by weight, based on 100 parts by weight of the vinyl chloride. When the unsaturated carboxylic acid-based compound is used within the amount range, the amount of unreacted unsaturated carboxylic acid-based compound remaining in the resin after finishing the polymerization may be decreased, and thus the thermal discoloration of the vinyl chloride-based resin may be minimized.

The total amount of the unsaturated carboxylic acid-based compound and the ethylenic unsaturated compound may be injected in an amount of 1 to 40 parts by weight, and specifically 10 to 30 parts by weight, based on 100 parts by weight of the vinyl chloride. When the unsaturated carboxylic acid-based compound is used within the amount range, the amount of unreacted unsaturated carboxylic acid-based compound may be decreased, and thus the thermal discoloration of the vinyl chloride-based resin may be minimized.

When the additive is used as the emulsifier, the emulsifier may include an anionic emulsifier, a non-ionic emulsifier, or a combination thereof.

The anionic emulsifier may include an alkali metal salt or an ammonium salt of a C6 to C20 fatty acid, an alkali metal salt or an ammonium salt of a C6 to C20 alkylsulfonic acid, an alkali metal salt or an ammonium salt of a C6 to C20 alkylbenzenesulfonic acid, an alkali metal salt or an ammonium salt of a C6 to C20 alkylsulfate, an alkali metal salt or an ammonium salt of a C6 to C20 alkyldisulfonic acid diphenyloxide, or a combination thereof. Examples of the alkali metal salt of an alkylsulfate may be sodium lauryl sulfate, and the like, but are not limited thereto. Among them, the alkali metal salt or an ammonium salt of a C6 to C20 fatty acid having strong heat resistance may preferably be used.

The non-ionic emulsifier may include a C6 to C20 alcohol, polyethylene oxide, polyoxyethylene alkylphenylether, polyoxyethylene alkylether, sorbitan monolaurate, polyvinyl alcohol, polyethylene glycol, or a combination thereof. Examples of the alcohol may be cetyl alcohol, but are not limited thereto. Among them, an alcohol having strong heat resistance may preferably be used.

The emulsifier may be a mixture of the anionic emulsifier and the non-ionic emulsifier. Herein, the anionic emulsifier and the non-ionic emulsifier may be mixed in a weight ratio of 1:0.5 to 1:200, and specifically 1:2 to 1:50. When the anionic emulsifier and the non-ionic emulsifier are mixed within the weight ratio range, the stability of the slurry may be ensured, the reaction conversion rate of the ethylenic unsaturated compound may be increased as much as possible, and the thermal transport from the surface of the polymerized vinyl chloride-based resin to the inside of the resin may be prevented as much as possible.

The emulsifier may be mixed in an amount of 0.005 to 1.0 parts by weight, and specifically 0.01 to 0.1 parts by weight, based on 100 parts by weight of the vinyl chloride. When the emulsifier is used within the amount range, the reaction conversion rate of the ethylenic unsaturated compound may be increased as much as possible, and the heat transfer from the surface of the polymerized vinyl chloride-based resin to the inside of the resin may be prevented as much as possible, so as to minimize the heat discoloration.

The oil soluble initiator used during the suspension polymerization may include t-butylperoxy neodecanoate, diisopropylperoxy dicarbonate, methylethylketone peroxide, di-2-ethylhexylperoxy dicarbonate, di-3-methoxybutylperoxy dicarbonate, t-butylperoxy pivalate, t-amylperoxy pivalate, t-hexylperoxy pivalate, or a combination thereof.

The oil soluble initiator may be used in an amount of 0.01 to 1 parts by weight, and specifically 0.02 to 0.1 parts by weight, based on 100 parts by weight of the vinyl chloride. When the oil soluble initiator is used within the amount range, it has excellent polymerization reactivity, and the polymerization reaction heat is easily controlled.

The water-soluble initiator used as the additive may include potassium persulfate, ammonium persulfate, sodium persulfate, sodium bisulfate, sodium hydrosulfite, or a combination thereof.

When the oil soluble initiator and the water-soluble initiator are used together, each may be mixed in a weight ratio of 95:5 to 5:95, for example, 90:10 to 10:90. When the oil soluble initiator and the water-soluble initiator are mixed within the ratio range, the productivity may be improved by appropriately adjusting the polymerization time.

When the emulsifier and the water-soluble initiator are used together as the additive, the emulsifier and the water-soluble initiator may be mixed in a weight ratio of 1:50 to 50:1, for example, a weight ratio of 1:20 to 20:1, a weight ratio of 1:1 to 20:1, or a weight ratio of 2:1 to 15:1. When the emulsifier and the water-soluble initiator are mixed within the ratio range, it may obtain excellent resin discoloration resistance while minimizing the adherence deterioration according to use of the emulsifier.

The dispersant used during the suspension polymerization may include polyvinyl alcohol, cellulose, gelatin, an acrylic acid polymer, a methacrylic acid polymer, an itaconic acid polymer, a fumaric acid polymer, a maleic acid polymer, a succinic acid polymer, or a combination thereof, which has a degree of saponification of greater than or equal to 40%.

The dispersant may be used in an amount of 0.03 to 5 parts by weight, and specifically 0.05 to 2.5 parts by weight, based on 100 parts by weight of the vinyl chloride. When the dispersant is used within the amount range, it may produce a normal particle having a size of about 80 to 200 μm.

Mode for Invention

The following examples and comparative examples illustrate the present invention in more detail. However, these examples are preferable examples of the present invention, and the present invention is not limited thereto.

EXAMPLE 1

After removing oxygen from a 100 L reactor using a vacuum pump, 30 kg (100 parts by weight) of a vinyl chloride monomer, 2 parts by weight of maleic acid, and 16 parts by weight of vinyl acetate are input thereto, and 0.1 parts by weight of polyvinyl alcohol having a saponification degree of 80%, 60 kg of polymerization water at 70° C., and 0.02 parts by weight of sodium lauryl sulfate and 0.04 parts by weight of cetyl alcohol as an emulsifier are input thereto under agitation. 0.07 parts by weight of t-butylperoxy neodecanoate is added thereto as an oil soluble initiator to initiate suspension polymerization. The reaction is continued for 6 h while the reactor temperature is maintained at 68° C., the polymerization is quenched at the time when the reactor pressure is decreased by 1.0 kg/cm$^2$ compared to the early polymerization stage, and the unreacted monomer is recovered to complete the polymerization. The polymerized slurry is dehydrated and dried to provide a vinyl chloride-based resin having an average particle size of 160 μm.

EXAMPLE 2

A vinyl chloride-based resin is prepared in accordance with the same procedure as in Example 1, except that 0.03 parts by weight of sodium lauryl sulfate and 0.06 parts by weight of cetyl alcohol are added as an emulsifier.

EXAMPLE 3

A vinyl chloride-based resin is prepared in accordance with the same procedure as in Example 1, except that 0.04 parts by weight of sodium lauryl sulfate and 0.08 parts by weight of cetyl alcohol are added as an emulsifier.

EXAMPLE 4

A vinyl chloride-based resin is prepared in accordance with the same procedure as in Example 1, except that 0.1 parts by weight of cetyl alcohol is added as an emulsifier, instead of 0.01 parts by weight of sodium lauryl sulfate and 0.02 parts by weight of cetyl alcohol.

EXAMPLE 5

A vinyl chloride-based resin is prepared in accordance with the same procedure as in Example 1, except that 0.2 parts by weight of cetyl alcohol is added as an emulsifier instead of 0.01 parts by weight of sodium lauryl sulfate and 0.02 parts by weight of cetyl alcohol.

EXAMPLE 6

A vinyl chloride-based resin is prepared in accordance with the same procedure as in Example 1, except that 0.3 parts by weight of cetyl alcohol is added as an emulsifier instead of 0.01 parts by weight of sodium lauryl sulfate and 0.02 parts by weight of cetyl alcohol.

EXAMPLE 7

A vinyl chloride-based resin is prepared in accordance with the same procedure as in Example 1, except that the emulsifiers, which are sodium lauryl sulfate and cetyl alcohol, are not added, 0.04 parts by weight of t-butylperoxy neodecanoate is added as an oil soluble initiator, and 0.03 parts by weight of potassium persulfate is further added as a water-soluble initiator.

EXAMPLE 8

A vinyl chloride-based resin is prepared in accordance with the same procedure as in Example 3, except that 0.04 parts by weight of t-butylperoxy neodecanoate is added as an oil soluble initiator, and 0.03 parts by weight of potassium persulfate is further added as a water-soluble initiator.

EXAMPLE 9

A vinyl chloride-based resin is prepared in accordance with the same procedure as in Example 6, except that 0.04 parts by weight of t-butylperoxy neodecanoate is added as an oil soluble initiator, and 0.03 parts by weight of potassium persulfate is further added as a water-soluble initiator.

COMPARATIVE EXAMPLE 1

A vinyl chloride-based resin is prepared in accordance with the same procedure as in Example 1, except that the emulsifiers, which are sodium lauryl sulfate and cetyl alcohol, are not added thereto.

COMPARATIVE EXAMPLE 2

After removing oxygen from a 100 L reactor using a vacuum pump, 30 kg (100 parts by weight) of a vinyl chloride monomer, 2 parts by weight of maleic acid, and 16 parts by weight of vinyl acetate are input thereto, and 0.8 parts by weight of sodium lauryl sulfate and 1.5 parts by weight of cetyl alcohol are added thereto under agitation. 0.07 parts by weight of potassium persulfate is added thereto as an initiator to initiate polymerization. It is reacted for 6 h while the reactor temperature is maintained at 68° C., the polymerization is quenched at a time when the reactor pressure is decreased by 1.0 kgf/cm$^2$ compared to the early polymerization stage, and the unreacted monomer is recovered such that the polymerization is finished. The polymerized slurry is dehydrated and dried to provide a vinyl chloride-based resin having an average particle size of 1.5 μm.

Evaluation 1: Measurement of Average Particle Diameter of Vinyl Chloride-Based Resin Vinyl chloride-based resins obtained from Examples 1 to 9 and Comparative Examples 1 and 2 are measured for an average particle diameter using a Malvern Mastersizer, and the results are shown in the following Table 1.

Evaluation 2: Measurement of Discoloration of Vinyl Chloride-Based Resin

Vinyl chloride-based resins obtained from Examples 1 to 9 and Comparative Examples 1 and 2 are let stand at a temperature of 70° C. using a hot air oven for 60 h, and then the color difference L, a, b of the resin is measured using a color meter (Hunter Lab), and the results are shown in the following Table 1.

Evaluation 3: Measurement of Transparency and Adherence of Vinyl Chloride-Based Resin 20 parts by weight of vinyl chloride-based resins obtained from Examples 1 to 9 and Comparative Examples 1 and 2 and 80 parts by weight of ethyl acetate are dissolved by stirring at a temperature of 50° C. for 90 min, and transparency and adherence of the solutions are measured, respectively.

The transparency of each solution is measured at a region of 600 nm using ultraviolet (UV) spectrometry.

In order to measure adherence, the solution is coated on an aluminum film to provide a sample by applying a pressure of 2 kgf/cm$^2$ at 180° C. for 1 sec using a heat-sealing tester, and the strength of the adhesive surface is measured under the condition of 50 mm/min using a tensile strength tester.

TABLE 1

| | Amount of carboxylic acid in resin (wt %) | Average particle diameter of resin (μm) | Color L | Color a | Color b | Transparency (%) | Adherence (gf) |
|---|---|---|---|---|---|---|---|
| Ex. 1 | 0.62 | 131 | 83.6 | 4.6 | 5.2 | 86.9 | 504 |
| Ex. 2 | 0.71 | 120 | 86.3 | 3.8 | 6.7 | 85.4 | 476 |
| Ex. 3 | 0.78 | 102 | 88.4 | 2.6 | 7.4 | 84.2 | 448 |
| Ex. 4 | 0.59 | 157 | 82.4 | 5 | 4.7 | 87.7 | 572 |
| Ex. 5 | 0.64 | 150 | 83.5 | 4.4 | 5.9 | 86.2 | 628 |
| Ex. 6 | 0.67 | 145 | 85.6 | 4 | 6.7 | 85.7 | 662 |
| Ex. 7 | 0.68 | 171 | 88.2 | 4.5 | 5.16 | 84.5 | 601 |
| Ex. 8 | 0.81 | 112 | 89.3 | 2.1 | 7.8 | 83.3 | 468 |
| Ex. 9 | 0.71 | 147 | 87.4 | 3.6 | 7.1 | 84.2 | 672 |
| Comp. Ex. 1 | 0.57 | 160 | 80.2 | 5.6 | 4.3 | 87.3 | 553 |
| Comp. Ex. 2 | 0.78 | 1.5 | 88.3 | 2.6 | 7.7 | 75.5 | 246 |

L refers to brightness, a refers to a color difference of a red color, and b refers to a color difference of a yellow color.

Through Table 1, it is understood that in the case of Examples 1 to 9 obtained by adding an emulsifier and/or a water-soluble initiator in the suspension polymerization using vinyl chloride, an unsaturated carboxylic acid-based compound, and an ethylenic unsaturated compound that is copolymerizable therewith according to an embodiment, adherence and solution transparency are excellent and the thermal discoloration of the resin is minimized, compared to the cases of Comparative Example 1 not added with an emulsifier and/or water-soluble initiator and Comparative Example 2 providing a vinyl chloride-based resin according to the emulsion polymerization. Furthermore, Examples 7 to 9 obtained by adding an oil soluble initiator and a water-soluble initiator together may minimize thermal discoloration of a resin and may also provide excellent adherence and solution transparency, compared to Examples 3 and 6 not adding a water-soluble initiator, as well as Comparative Example 1.

In addition, referring to Examples 1 to 3, it is understood that the amount of carboxylic acid present in the resin is increased according to increasing the adding amount of the emulsifier, thus the resin discoloration is further improved. The increasing the amount of carboxylic acid present in the resin means a high reaction conversion rate of an unsaturated carboxylic acid-based compound in the polymerization, and thereby, the thermal discoloration is minimized by the low remaining amount of non-reacted unsaturated carboxylic acid-based compound.

In addition, referring to Examples 4 to 6, it is understood that the adherence is further improved and the resin discoloration is improved according to increasing the adding amount of the emulsifier.

Further, referring to Examples 7 to 9, it is confirmed that Examples 8 and 9 obtained by adding an emulsifier together with an oil soluble initiator and a water-soluble initiator may further improve the resin discoloration, compared to Example 7 obtained by only adding the oil soluble initiator and the water-soluble initiator without the emulsifier.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of preparing a vinyl chloride-based resin, comprising:
   preparing a slurry through suspension polymerization by mixing a monomer, an oil soluble initiator, a dispersant, and an additive including a water-soluble initiator,
   wherein the monomer includes vinyl chloride, an unsaturated carboxylic acid-based compound, and an ethylenic unsaturated compound that is copolymerizable therewith.

2. The method of claim 1, further comprising:
   removing an unreacted monomer from the slurry, and
   dehydrating and drying the slurry after removing the unreacted monomer.

3. The method of claim 1, wherein the additive further comprises an anionic emulsifier as an emulsifier, the anionic emulsifier comprising an alkali metal salt or an ammonium salt of a C6 to C20 fatty acid, an alkali metal salt or an ammonium salt of a C6 to C20 alkylsulfonic acid, an alkali metal salt or an ammonium salt of a C6 to C20 alkylbenzenesulfonic acid, an alkali metal salt or an ammonium salt of a C6 to C20 alkylsulfate, an alkali metal salt or an ammonium salt of a C6 to C20 alkyldisulfonic acid diphenyloxide, or a combination thereof.

4. The method of claim 1, wherein the additive further comprises a non-ionic emulsifier as an emulsifier, the non-ionic emulsifier comprising a C6 to C20 alcohol, polyethylene oxide, polyoxyethylene alkylphenylether, polyoxyethylene alkylether, sorbitan monolaurate, polyethylene glycol, or a combination thereof.

5. The method of claim 1, wherein the additive is mixed in an amount of 0.005 to 1.0 parts by weight based on 100 parts by weight of the vinyl chloride.

6. The method of claim 1, wherein the additive further comprises an emulsifier, the emulsifier comprising an anionic emulsifier and a non-ionic emulsifier, in a weight ratio of 1:0.5 to 1:200.

7. The method of claim 1, wherein the water-soluble initiator comprises potassium persulfate, ammonium persulfate, sodium persulfate, sodium bisulfate, sodium hydrosulfite, or a combination thereof.

8. The method of claim 1, wherein the oil soluble initiator comprises t-butylperoxy neodecanoate, diisopropylperoxy dicarbonate, methylethylketone peroxide, di-2-ethylhexylperoxy dicarbonate, di-3-methoxybutylperoxy dicarbonate, t-butylperoxy pivalate, t-amylperoxy pivalate, t-hexylperoxy pivalate, or a combination thereof.

9. The method of claim 1, wherein the additive further comprises an emulsifier, and the emulsifier and the water-soluble initiator are included in a weight ratio of 1:50 to 50:1.

10. The method of claim 1, wherein the unsaturated carboxylic acid-based compound comprises: an unsaturated carboxylic acid including maleic acid, maleic acid anhydride, itaconic acid, acrylic acid, methacrylic acid, alpha-cyanoacrylic acid, or a combination thereof; an alkylester of an unsaturated carboxylic acid including methylacrylate, ethylacrylate, butylacrylate, octylacrylate, cyanoethylacrylate, methylmethacrylate, ethylmethacrylate, butylmethacrylate, or a combination thereof; or a combination thereof.

11. The method of claim 1, wherein the ethylenic unsaturated compound comprises: vinyl acetate, vinyl propionate ester, acrylonitrile, methacrylonitrile, methylacrylamide, N-methylolacrylamide, ethylvinylether, chloroethylvinylether, alpha-methylstyrene, vinyltoluene, chlorostyrene, vinylnaphthalene, vinylidene fluoride, vinylidenechloride, vinylchloroacetate, olefin, chlorinated olefin, isobutylvinyl ether, or a combination thereof.

12. The method of claim 1, wherein a total amount of the unsaturated carboxylic acid-based compound and the ethylenic unsaturated compound is 1 to 40 parts by weight based on 100 parts by weight of the vinyl chloride.

13. The method of claim 1, wherein the dispersant comprises: polyvinyl alcohol having a degree of saponification of greater than or equal to 40%, cellulose, gelatin, an acrylic acid polymer, a methacrylic acid polymer, an itaconic acid polymer, a fumaric acid polymer, a maleic acid polymer, a succinic acid polymer, or a combination thereof.

* * * * *